United States Patent [19]

Hirose et al.

[11] Patent Number: 5,121,378
[45] Date of Patent: Jun. 9, 1992

[54] OPTICAL HEAD APPARATUS FOR FOCUSSING A MINUTE LIGHT BEAM SPOT ON A RECORDING MEDIUM

[75] Inventors: Yutaka Hirose; Yutaka Yamanaka, both of Tokyo, Japan

[73] Assignee: NEC Corporation, Tokyo, Japan

[21] Appl. No.: 366,073

[22] Filed: Jun. 14, 1989

[30] Foreign Application Priority Data

| Jun. 14, 1988 | [JP] | Japan | 63-147241 |
| Jun. 14, 1988 | [JP] | Japan | 63-147243 |
| Jun. 29, 1988 | [JP] | Japan | 63-164025 |
| Jun. 29, 1988 | [JP] | Japan | 63-164026 |
| Jun. 29, 1988 | [JP] | Japan | 63-164027 |
| Jun. 29, 1988 | [JP] | Japan | 63-164029 |
| Sep. 28, 1988 | [JP] | Japan | 63-245063 |

[51] Int. Cl.$^5$ .................................... G11B 7/18
[52] U.S. Cl. .................. 369/112; 369/118; 369/44.12
[58] Field of Search ............. 369/112, 116, 44.42, 369/44.37, 44.24, 44.23; 350/448, 438, 384; 250/201.8, 201.5

[56] References Cited

U.S. PATENT DOCUMENTS

| 4,339,177 | 7/1982 | March | 350/448 X |
| 4,682,315 | 7/1987 | Uejima | 369/44.42 X |
| 4,766,585 | 10/1988 | Fukumoto | 369/112 X |
| 4,811,328 | 3/1989 | Ito et al. | 369/44.24 X |
| 4,893,008 | 1/1990 | Horikawa | 350/6.6 X |

FOREIGN PATENT DOCUMENTS

| 0092240 | 4/1987 | Japan | 369/44.24 |
| 0185251 | 8/1987 | Japan | 369/44.24 |

Primary Examiner—Roy N. Envall, Jr.
Assistant Examiner—Muhammad N. Edun
Attorney, Agent, or Firm—Sughrue, Mion, Zinn, Macpeak & Seas

[57] ABSTRACT

In an optical head apparatus, a minute light beam spot is formed on a recording medium by a focusing lens. The focusing lens focuses light radiated from a light source to provide the minute light beam spot. Between the light source and the focusing lens, a light intensity or phase distribution converter is provided, so that the minute light beam spot will be a super resolved light beam spot.

8 Claims, 14 Drawing Sheets

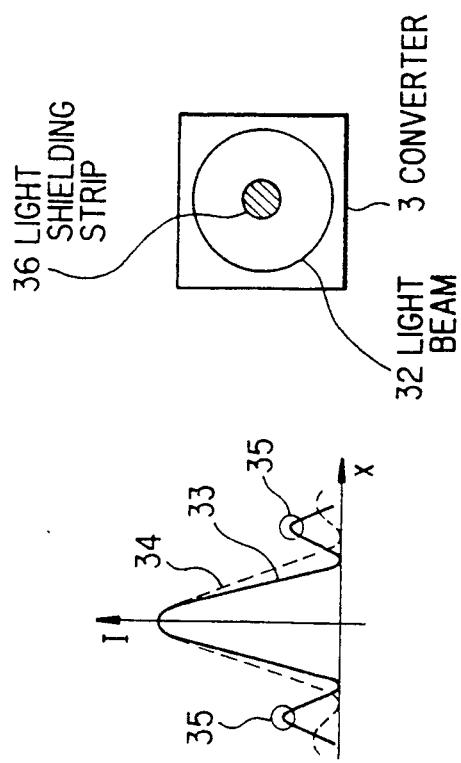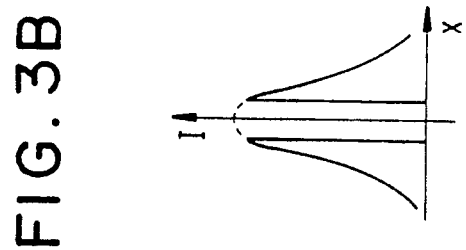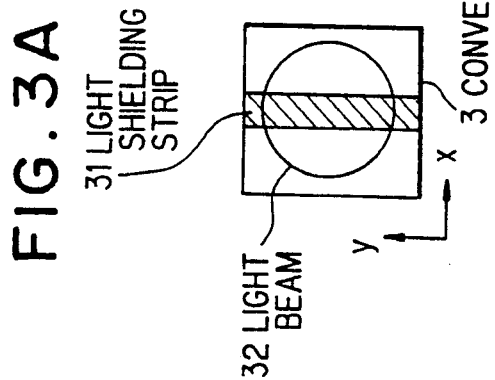

LIGHT INTENSITY DISTRIBUTION

COLLIMATED LIGHT BEAM

OPTICAL HEAD APPARATUS FOR FOCUSSING A MINUTE LIGHT BEAM SPOT ON A RECORDING MEDIUM

FIELD OF THE INVENTION

The invention relates to an optical head apparatus, and more particularly to an optical head apparatus which is applied to an information input and output apparatus for recording information into a recording medium and reading information from the recording medium by use of light.

BACKGROUND OF THE INVENTION

In an information input and output apparatus for recording information into a recording medium and reading information from the recording medium by use of light, there is a disk-like recording medium on which concentric or spiral tracks are provided to form recording pits thereon, thereby recording binary information into the recording medium in accordance with the presence or non-presence of the recorded pit. The recorded pit is formed on the track by projecting a minute light beam spot obtained in accordance with the focusing of light radiated from a light source. Information thus recorded in the recording medium is read from the recording medium by supplying a minute light beam spot to the track and receiving light reflected from the track, thereby detecting the presence or non-presence of the recording pit. For the purpose of recording information into a recording medium and reading information from the recording medium, a typical type of an optical head apparatus comprises a light source for radiating light of a predetermined wavelength, a focusing lens for focusing the light on the recording medium, an optical system for separating light reflected on the recording medium from a path of the light directly radiated from the light source, and an optical detector for detecting the light returned from the recording medium. Such an optical head apparatus is described on pages 483 to 489 of "Applied Optics, Vol. 25, No. 4, Feb. 15, 1986".

In the optical head apparatus, the smaller the diameter of a minute light beam spot focused on the recording medium the better it is for the purpose of increasing recorded density. The diameter of the minute light beam spot depends on the wavelength "λ" of light radiated from the light source, and a numerical aperture "NA" of the focusing lens, such that it is proportional to "λ/NA". Therefore, the development of an optical head apparatus has been promoted in direction that the wavelength λ is short, and the numerical aperture NA is large, so that the diameter of the minute light beam spot becomes small.

Another optical head apparatus is described on pages 553 to 557 of "Journal of the Optical Society of America, Vol. 39, No. 7, July 1949" in which a theoretical method is studied to reduce the diameter of a minute light beam spot on a recording medium. In the optical head apparatus, the light intensity of a central portion (main lobe) of focused light is lowered in light incident cross-section of a focusing lens relatively to that of a peripheral portion (side lobe) of the focused light, so that a minute light beam spot having a diameter less than the diffraction limit is obtained. This is known as the super-resoluved beam spot.

According to the former optical head apparatus, however, there is the disadvantage that the diameter of the minute light beam spot projected on the recording medium can not be smaller than the diffraction limit. Therefore, there is a limitation in increasing a recorded density of the recording medium.

According to the latter optical head apparatus, there is the disadvantage that, although the central portion (main lobe) of the focused light can be smaller in its diameter than the diffraction limit, the light intensity of the peripheral portion (side lobe) of the focused light increases. Therefore, the noise increases in signals read from the recording medium to deteriorate a read-out characteristic, where the light intensity of the peripheral portion (side lobe) of the focused light is increased.

There is another disadvantage that a light source for radiating light of high output must be provided, because the central portion (main lobe) of the focused light is interrupted to transmit to the recording medium by a light shielding member, thereby resulting in the reduction of light utilizing factor.

SUMMARY OF THE INVENTION

Accordingly, it is the first object of the invention to provide an optical head apparatus in which a minute light beam spot having a diameter less than the diffraction limit is obtained to increase the recording density of a recording medium.

It is the second object of the invention to provide an optical head apparatus in which a peripheral portion (side lobe) of a minute light beam spot having a diameter less than a diffraction limit has a low light intensity to increase a read-out characteristic.

It is the third object of the invention to provide an optical head apparatus in which a minute light beam spot having a diameter less than the diffraction, limit is obtained without the provision of a light shielding member to the same extent as in the provision of the light shielding member, so that the light utilizing factor is increased to the same level as would resulted without the light shielding member.

It is the fourth object of the invention to provide an optical head apparatus in which a peripheral portion (side lobe) of a minute light beam spot having a diameter less than a diffraction limit is lowered in its light intensity, and the light utilizing factor is increased as compared to an optical head apparatus including a light shielding member.

It is the fifth object of the invention to provide an optical head apparatus in which light reflected from a recording medium based on a peripheral portion (side lobe) of a focused light is avoided from being supplied to an optical detector of a signal reading-out system, thereby providing a good quality read-out signal.

It is the sixth object of the invention to provide an optical head apparatus in which a minute light beam spot having the diameter less than a diffraction limit is obtained solely by adjusting the phase of light.

According to the first feature of the invention, an optical head apparatus comprises an optical focusing system for focusing light radiated from a light source on a recording medium to form a minute light beam spot thereon by a focusing lens, an optical signal reading-out system for transmitting light reflected from the recording medium to an optical detector, and a light intensity distribution converting means for reducing the light intensity of a central portion (main lobe) of the minute light beam spot in a light incident cross-section of the focusing lens relatively to a peripheral portion (side lobe) of the minute light beam spot, the light intensity distribution converting means being provided between the light source and the focusing lens.

According to the second feature of the invention, the light intensity distribution converting means of the first feature transmits a central portion (main lobe) of the light radiated from the light source to the focusing lens and interrupts a peripheral portion (side lobe) of the light to be transmitted to the focusing lens.

According to the third feature of the invention, the light intensity distribution converting means of the first feature divides the light radiated from the light source into plural and parallel light fluxes to be transmitted to the focusing lens.

According to the fourth feature of the invention, the light intensity distribution converting means of the first feature controls a light intensity of the light radiated from the light source which is incident to the focussing lens to maximize a light amount at a peripheral portion of the focusing lens and to reduce a light amount in a central portion of the focusing lens gradually.

According to the fifth feature of the invention, the optical signal reading-out system of the first feature includes a lens for focusing the reflected light, and an aperture or a slit positioned at a focus of the lens or in the vicinity thereof.

According to the sixth feature of the invention, an optical head apparatus comprises an optical focusing system for focusing light radiated from a light source on a recording medium to form a minute light beam spot thereon by a focusing lens, an optical signal readingout system for transmitting light reflected from the recording medium to an optical detector, and a phase adjusting means for adjusting the phase of the central portion (main lobe) of the light radiated from the light source and supplied to the focusing lens in its cross-section thereof.

BRIEF DESCRIPTION OF DRAWINGS

The invention will be explained in more detail in conjunction with appended drawings wherein, FIGS. 3A to 3D are explanatory diagrams showing light intensity distribution converters and light intensity distribution in the first embodiment.

DESCRIPTION OF PREFERRED EMBODIMENTS

Figure 1:
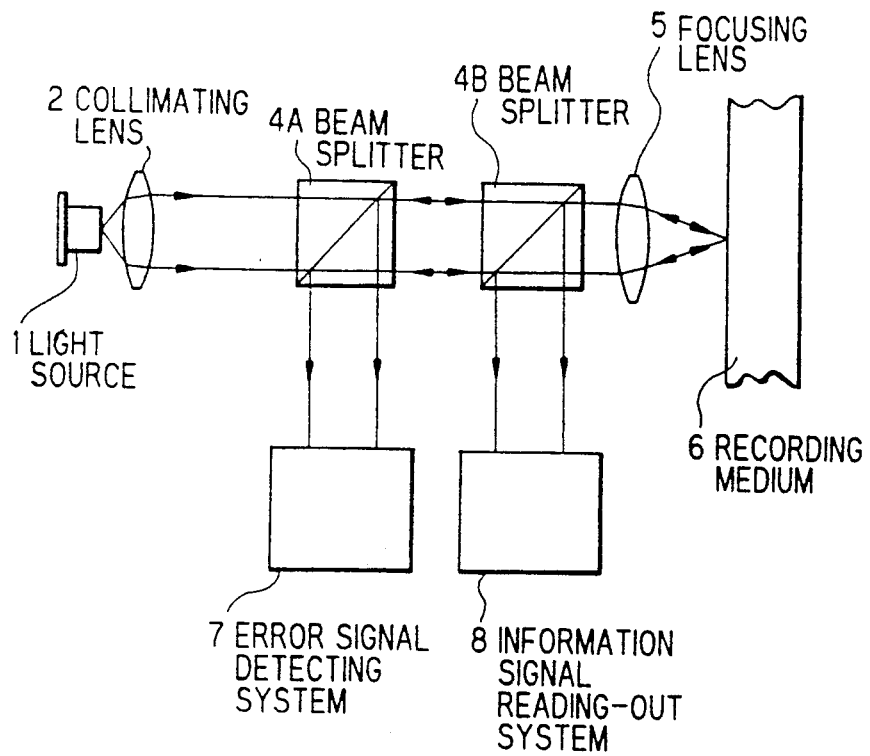
FIG. 1 is an explanatory diagram showing a conventional optical head apparatus.

Before explaining an optical head apparatus according to the invention, a conventional optical head apparatus will be explained in FIG. 1. In the conventional optical head apparatus, light is radiated from a light source 1, and collimated by a collimating lens 2. The collimated light is transmitted through beam splitters 4A and 4B and focused on a recording medium 6 by a focusing lens 5. Light thus focused on the recording medium 6 is reflected from the recording medium 6, and is divided to be supplied to an error signal detecting system 7 and an information signal reading-out system 8 by the beam splitters 4A and 4B, respectively. In the error signal detecting system, track and focusing errors are detected to control the position of the focusing lens 5, thereby correcting the errors. In the information signal reading-out system 8, on the other hand, information stored in the recording medium 6 is read-out in accordance with signal light reflected on a track of the recording medium 6 on which recording pits are formed dependent on the content of information.

Figure 2:
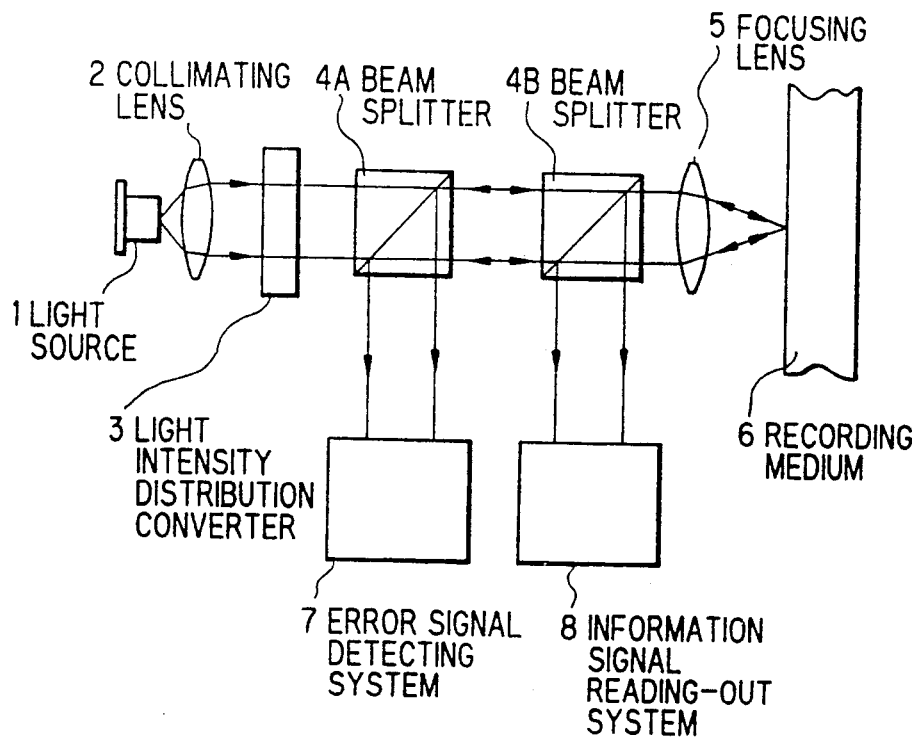
FIG. 2 is an explanatory diagram showing an optical head apparatus in a first embodiment according to the invention.

FIG. 2 shows an optical head apparatus in a first embodiment according to the invention. The optical head apparatus comprises a light source 1 for radiating light of a predetermined wavelength, a collimating lens 2 for supplying parallel light beam in accordance with the light radiated from the light source 1, a light intensity distribution converter 3 for converting light intensity distribution of the parallel light beam in its cross-section, beam splitters 4A and 4B for splitting light reflected from a recording medium 6, a focusing lens 5 for focusing the parallel light beam on the recording medium 6 to form a minute light beam spot on the recording medium 6, a track and focusing error signal detecting system 7 for detecting track and focusing errors in accordance with light supplied from the beam splitter 4A, and a signal reading-out system 8 for reading-out signals stored in the recording medium 6 in accordance with light supplied from the beam splitter 4B.

The light intensity distribution converter 3 which is used in the first embodiment will be explained in FIGS. 3A to 3D. In FIG. 3A, the light intensity distribution converter 3 includes a light shielding strip 31 having a narrow rectangle shape which is positioned in the center of the light beam 32 supplied to the focusing lens 5. The light shielding strip 31 has a short side along X-axis and a long side longer than the diameter of the light beam 32 along Y-axis. Therefore, the intensity I of light incident to the focusing lens 3 is distributed along X-axis as shown in FIG. 3B. As a result, the light intensity is distributed along X-axis on the recording medium 6 as shown by a solid line 33 in FIG. 3C, where a central portion (main lobe) of the solid curve 33 is narrower along the X-axis than that of a dotted curve 34 indicating the light intensity distribution in case of including no light shielding strip, so that the central portion (main lobe) of light focused on the recording medium 6 becomes decreased compared with the diffraction limit. The light shielding strip 31 may be replaced by an approximately circular shielding strip 36 as shown in FIG. 3D. In case of using such a circular shielding strip 36, the light intensity is distributed in a radial direction of the focused light on the recording medium 6 in the same manner as the light intensity in X axis as shown in FIG. 3A, so that a central portion (main lobe) of the focused light is shrunk in all radial directions. Where such a minute light beam spot having a central portion (main lobe) smaller than a diffraction limit is used for writing information into the recording medium 6 or reading information from the recording medium, a recording pit smaller than the conventional one can be formed to realize a higher recording density.

Figure 8:
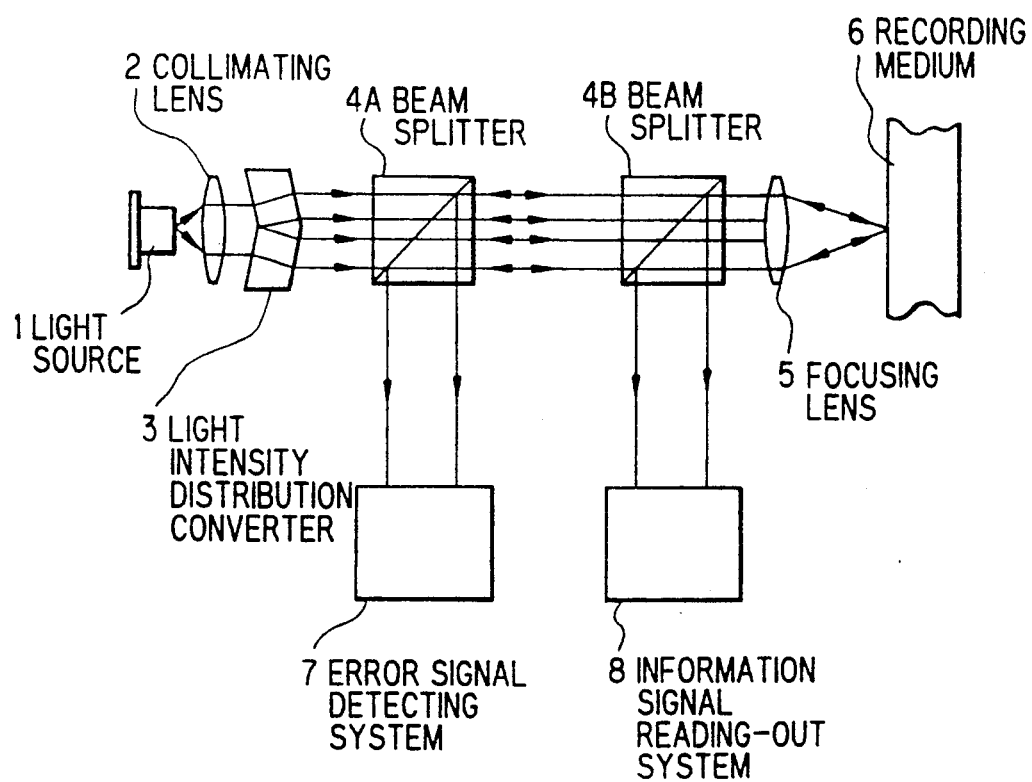
FIG. 8 is an explanatory diagram showing an optical head apparatus in a third embodiment according to the invention.

In operation, light is radiated from the light source 1, and is collimated by the collimating lens 2. The collimated light beam is partially shielded by the light intensity distribution converter 3 as shown in FIG. 3A or FIG. 3D. Thus, the light distribution with converted beam 32 having the light distribution of FIG. 8 is focused on the recording medium 6 by the focusing lens 5, so that the focused light having the central portion (main lobe) and a peripheral portion 35 (side lobes) are projected on the recording medium 6 as shown in FIG. 3C, and reflected on the recording medium 6. The reflected light beam is divided by the beam splitters 4A and 4B, so that light beam supplied from the beam splitter 4A is processed in the error signal detecting signal 7 to detect a track error and a focusing error, and light beam supplied from the beam splitter 4B is processed in the information signal reading-out system 8 to provide information read from the recording medium 6.

Figure 4A:
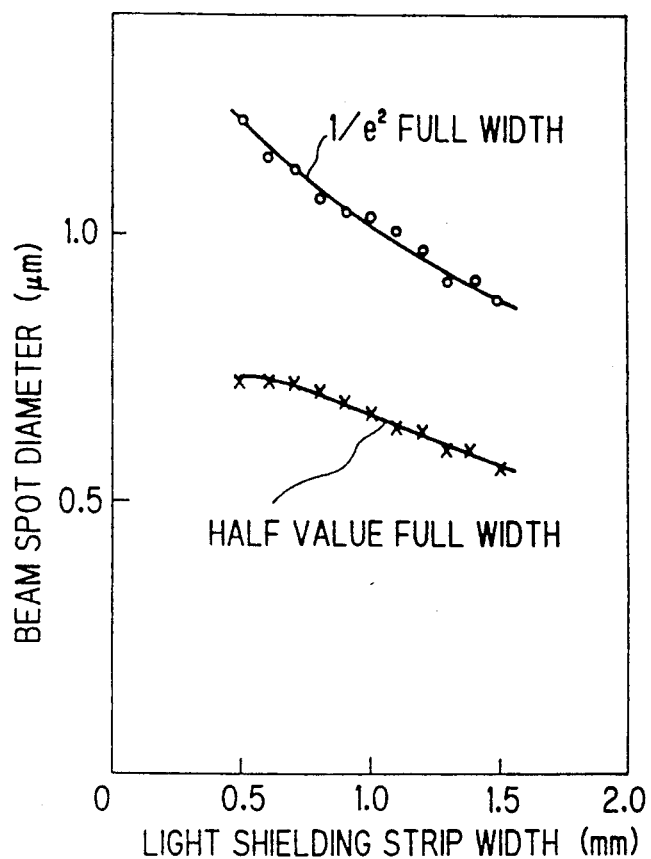
FIGS. 4A and 4B are graphs showing a light beam spot diameter and a ratio between a side lobe intensity and a main lobe intensity, respectively, relative to a light shielding strip width of the light intensity distribution converter in the first embodiment.
Figure 4B:
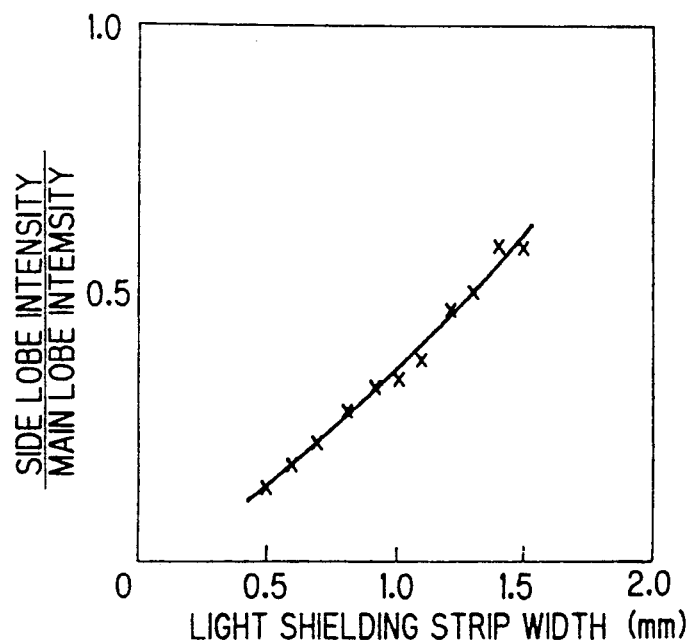

Next, the peripheral portion 35 (side lobe) of the focused light will be discussed in FIGS. 4A and 4B. FIG. 4A shows the relation of a super resolution beam spot diameter (main lobe diameter) relative to the light shielding strip width, and FIG. 4B shows a relation of a ratio between a side lobe intensity and a main lobe intensity relative to a light shielding strip width. As clearly understood from FIGS. 4A and 4B, a main lobe diameter of a beam spot is reduced as a width of a light shielding strip becomes large, while a side lobe intensity of the beam spot is increased as the width of the light shielding strip becomes large. Where a side lobe intensity is higher than a threshold value, a read-out characteristic of information is thereby affected. For instance, a recording error of information occurs where a side lobe intensity is equal to or more than one third of a main lobe intensity. In this respect, it is required that a width of the light shielding strip 31 or 36 is less than one fifth of an aperture of the focusing lens 5. The side lobe intensity can be more suppressed in the modification of the light intensity distribution converter 3 as explained later.

Figure 5:
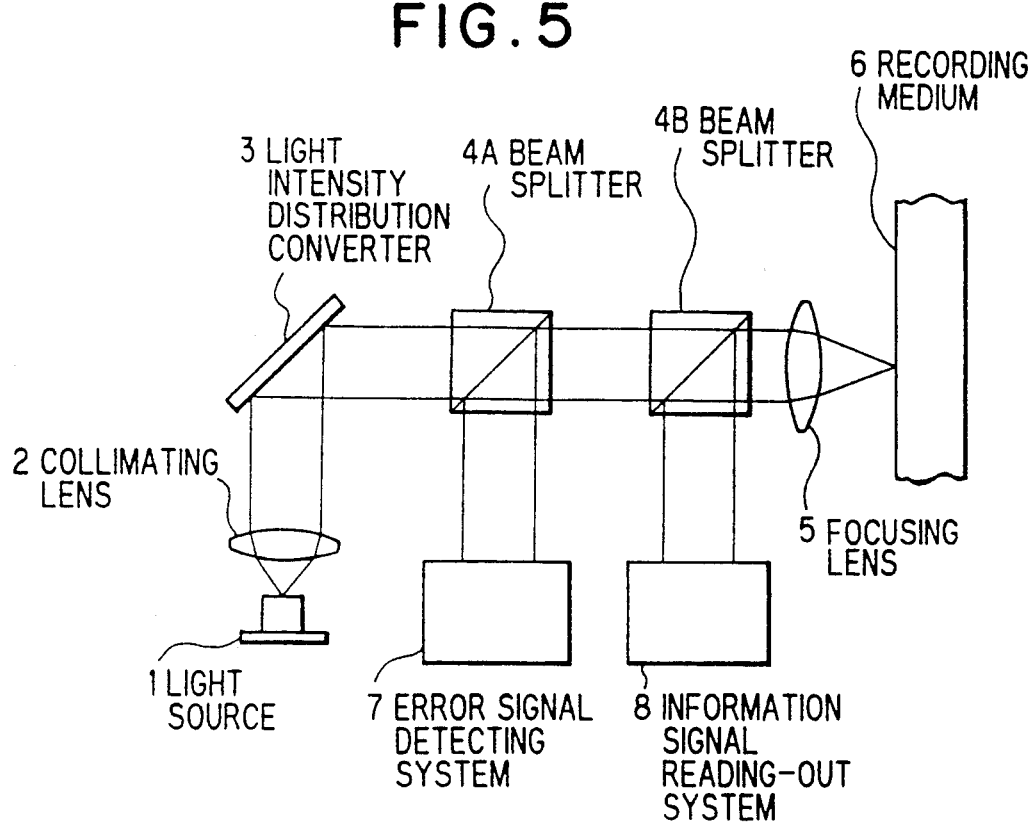
FIG. 5 is an explanatory diagram showing an optical head apparatus in the second embodiment according to the invention.
Figure 6A:
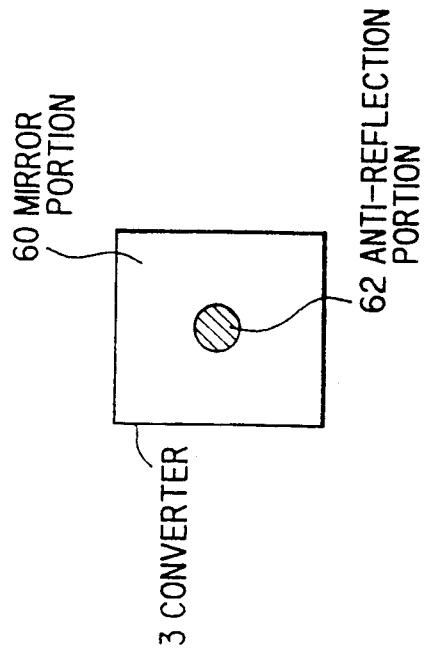
FIGS. 6A and 6B are explanatory diagrams showing light intensity distribution converters in the second embodiment.
Figure 6B:
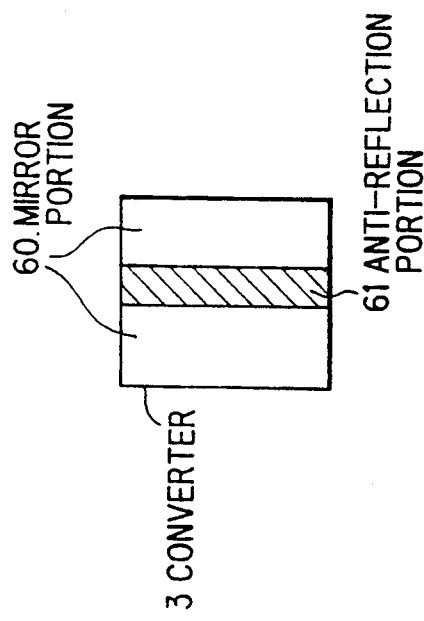

FIG. 5 shows an optical head apparatus in a second embodiment according to the invention, wherein like parts are indicated by like reference numerals in the first embodiment. In the optical head apparatus, light radiated from the light source 1 is made to be parallel light beam by the collimating lens 2, and is reflected by the light intensity distribution converter 3 which is also shown in FIG. 6A or 6B. The light intensity distribution converter 3 includes a mirror portion 60 and an anti-reflection (or low reflectivity) portion 61 of a rectangular shape or a circular anti-reflection (or low reflectivity) portion 62. Thus, a central portion (main lobe) of the reflected light beam is lowered in its light intensity with a cross-sectional pattern determined by the configuration of the anti-reflection portion 61 or 62. The light intensity distribution-converted light beam is focused on the recording medium 6 to form a super resoluved beam spot. Light reflected from the recording medium 6 is supplied to the error signal detecting system 7 and the information signal reading-out system 8 in the same manner as in the first embodiment.

Figure 7B:
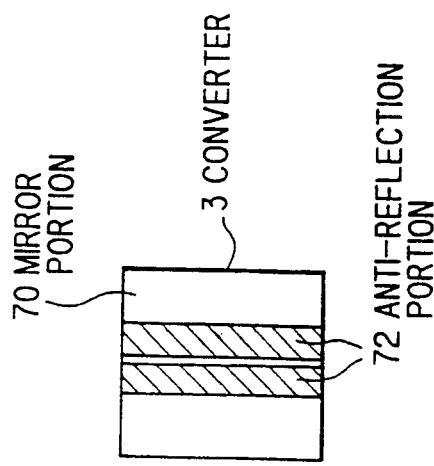
FIGS. 7A and 7B are explanatory diagrams showing other light intensity distribution converters.
Figure 7A:
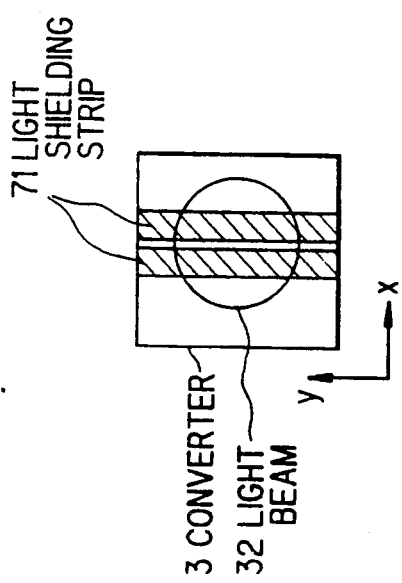

In the first embodiment, the light intensity distribution converter 3 may be replaced by one which is shown in FIG. 7A, wherein the converter 3 includes two light shielding strips 71 each having a rectangular shape, so that a narrow and vertical central portion of the light beam 32 is transmitted, while two adjacent portions of the light beam 32 are interrupted to be transmitted on the both sides of the central portion.

In the second embodiment, the light intensity distribution converter 3 may be replaced by one which is shown in FIG. 7B, wherein the converter 3 includes a mirror portion 70 and two anti-reflection portions 72 each having a rectangular shape, so that the same operation as in case of using the converter 3 of FIG. 7A is realized. In the second embodiment, an anti-reflection region may be a low-reflection factor region.

FIG. 8 shows an optical head apparatus in a third embodiment according to the invention, wherein like parts are indicated by like reference numerals in the first and second embodiments.

In the optical head apparatus, light radiated from the light source 1 is made to be parallel light beam by the collimating lens 2, and is divided into two light beam fluxes by the light intensity distribution converter 3 of a prism having a function of dividing light beam. The two light beam fluxes have a predetermined separation width corresponding to a width of the aforementioned shielding strip for shielding a central portion of the light beam. The predetermined separation width is adjusted in accordance with a refractive index, an apex angle, and a thickness of the prism. As a result, a super resoluved beam spot substantially equal to one in the first embodiment is obtained on the recording medium 6. Light reflected from the recording medium 6 is separated to be supplied to the error signal detecting system 7 and the information signal reading-out system 8 by the beam splitters 4A and 4B.

Figure 9A:
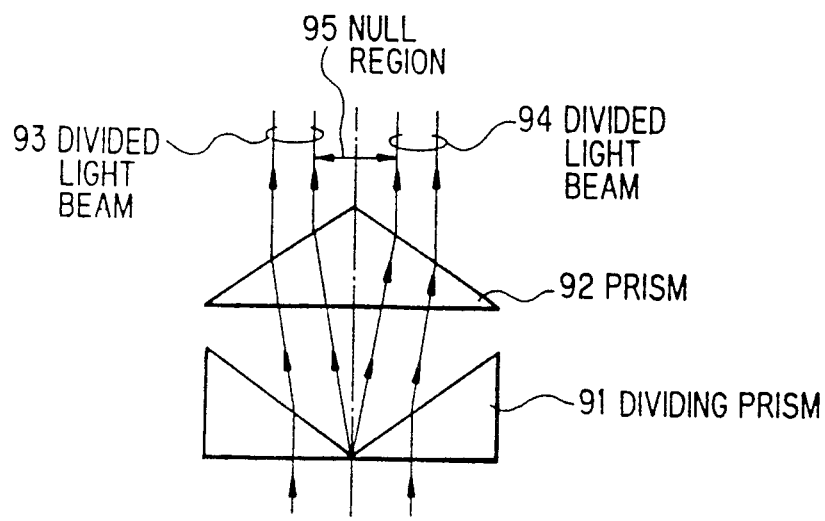
FIGS. 9A to 9C are explanatory diagrams showing light intensity distribution converters in the third embodiment.
Figure 9B:
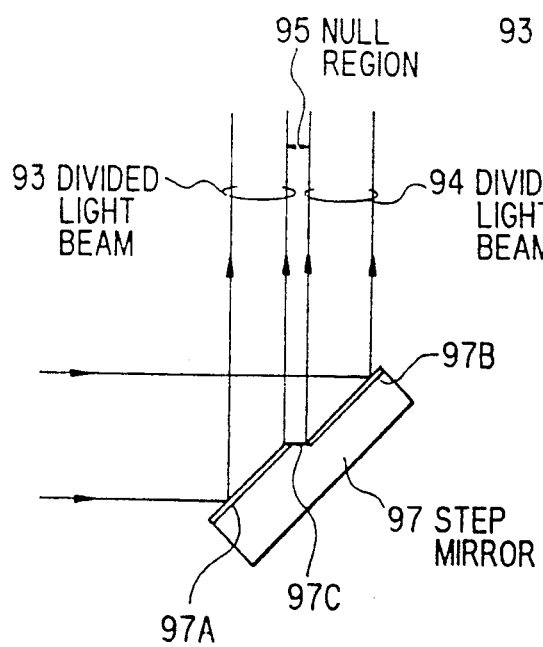
Figure 9C:
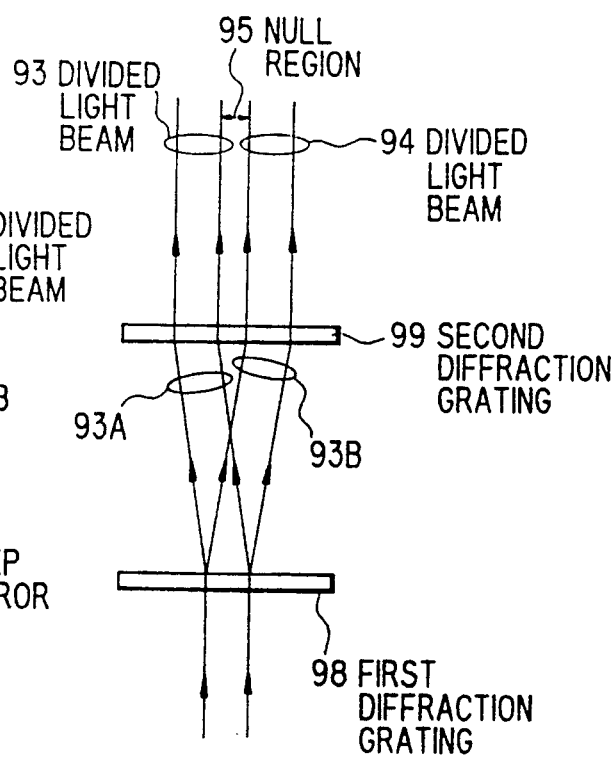

The light intensity distribution converter 3 in which the light beam is divided into the two light beam fluxes may be replaced by one which is shown in FIG. 9A, wherein a collimated incident light beam is divided into two light beam fluxes by a dividing prism 91, and the two light beam fluxes are made to be parallel relatively to a light axis of the collimated incident light by a prism 92, thereby providing two light beam fluxes 93 and 94 having a null region 95 therebetween. FIG. 9B shows a second type of the light intensity distribution converter 3 which is used in the third embodiment, wherein it includes a reflection mirror 97 having mirror surfaces 97A and 97B and a step portion 97C, so that two light beam fluxes 93 and 94 having a null region 95 therebetween are obtained, when parallel light beam is incident to the reflection mirror 97. A width of the light shielded region 95 is adjusted dependent on a width of the step portion 97C. Therefore, a light intensity distribution conversion is realized without using a light shielding member to the same extent as in case of using the light shielding member. Consequently, a super resolution beam spot is obtained on the recording medium 6 by the focusing lens 5. FIG. 9C shows a third type of the light intensity distribution converter 3 which is used in the third embodiment, wherein it includes a first diffraction grating 98 and a second diffraction grating 99, so that a major portion of an incident light amount is diffracted to provide plus and minus first order diffraction light fluxes 93A and 94A by the first diffraction grating 98 having a function as a dividing grating, and the two diffraction fluxes 93A and 94A are diffracted to provide two parallel light beam fluxes 93 and 94 having a null region 95 therebetween by the second diffraction grating 99 having a function as a direction correcting grating 99. The parallel light fluxes 93 and 94 are focused on the recording medium 6 to form a super resolution beam spot thereon by the focusing lens 5.

Figure 10A:
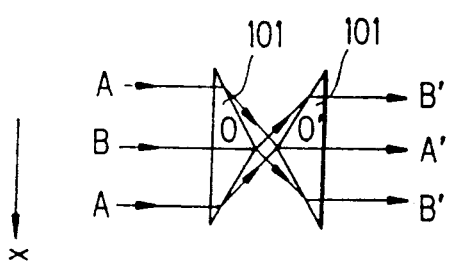
FIGS. 10A to 10F are explanatory diagrams showing light intensity distribution converters in a fourth embodiment according to the invention.
Figure 10D:
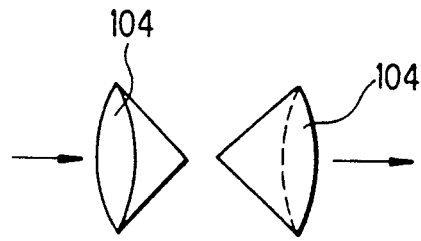
Figure 10B:
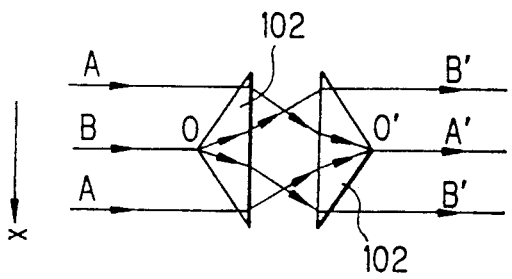
Figure 10E:
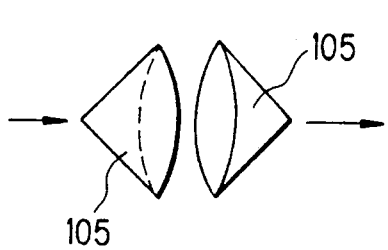
Figure 10C:
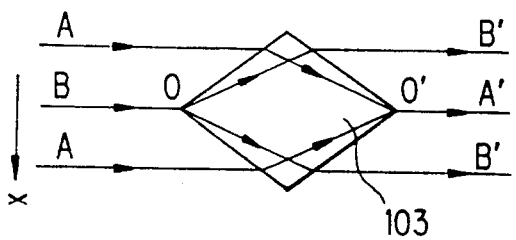
Figure 10F:
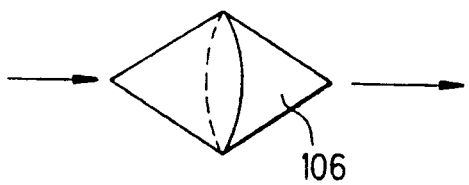

FIGS. 10A to 10F show light intensity distribution converters which are used for an optical head apparatus in a fourth embodiment according to the invention. The optical head apparatus is the same as the first to third embodiments except for the light intensity distribution converter. Therefore, the light intensity distribution converter will be only explained. FIG. 10A and 10B show a first type and a second type of the light intensity distribution converters, wherein the two converters include two roof type prisms 101 (FIG. 10A) and 102 (FIG. 10B) respectively, wherein a peripheral portion of an incident light will be a central portion of an output light via a line connected by points A, O' and A', and a central portion of the incident light will be a peripheral portion of the output light via a line connected by points B, 0 and B'. As a result, a light intensity distribution as shown in FIG. 3B is obtained, so that a super resolution beam spot is formed on a recording medium by a focusing lens. FIG. 10C shows a third type of the light intensity distribution converter, wherein it includes a prism 103 which is an integral structure consisting of two roof type prisms. Although the reduction of the beam spot diameter in one direction such as X-axis is realized in the first to third types of the light intensity distribution converters, because a roof type prism is used therein, the reduction of a beam spot diameter can be realized in all directions, where a conical prism is used as shown in FIGS. 10D to 10F. In FIGS. 10D and 10E, two conical prisms 104 and, 105 are combined, respectively, and in FIG. 10F, two conical prisms are integral with each other to provide an integral conical prism 106. As a matter of course, the reduction of a beam spot diameter in one direction such as X-axis contributes to the improvement of a line density or a track density, while the reduction of a beam spot diameter in the all radial directions contributes to the improvement of both line and track densities.

Figure 11:
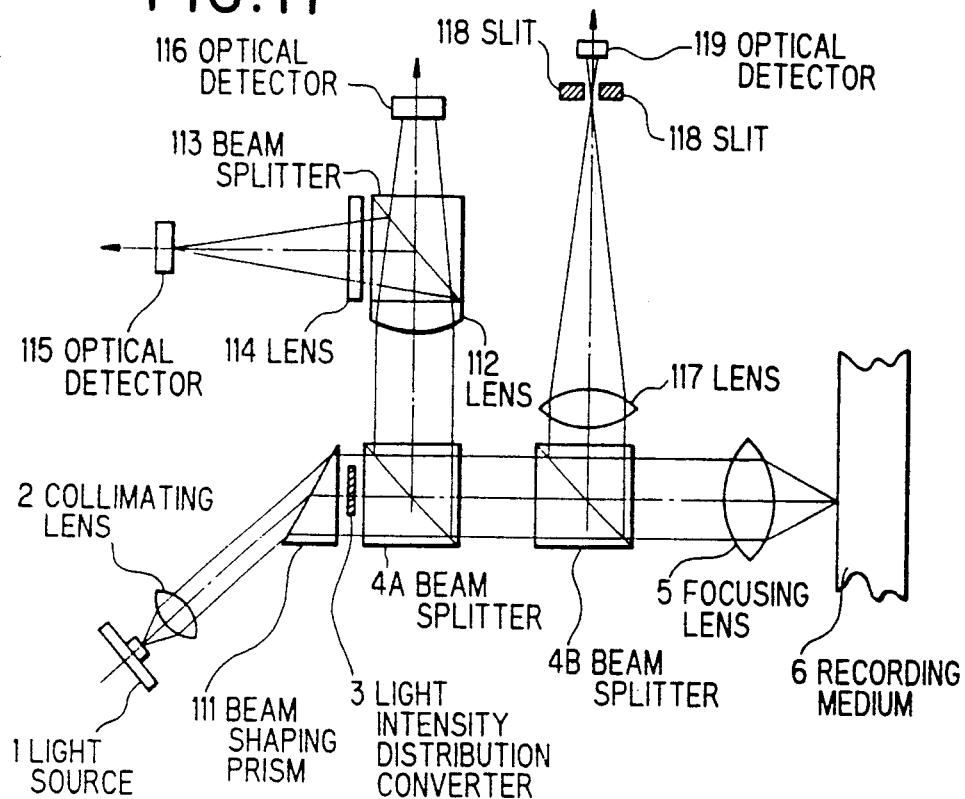
FIG. 11 is an explanatory diagram showing an optical head apparatus in a fifth embodiment according to the invention.

FIG. 11 shows an optical head apparatus in a fifth embodiment according to the the invention. In the optical head apparatus, light radiated from a light source 1 is collimated by a collimating lens 2, and is shaped by a beam shaping prism 111. The shaped light beam is supplied to a light intensity distribution converter 3, in which the central portion of the light beam is shielded. Output light beam of the converter 3 is transmitted through beam splitters 4A and 4B, and is focused on a recording medium 6 by a focusing lens 5. The focused light beam is then reflected from the recording medium 6, and is split by the beam splitters 4A and 4B. The split light beam of the beam splitter 4A is transmitted through a flat and concaved lens 112 to be supplied to a beam splitter 113, in which the light beam is split to be supplied to an optical detector 115 for detecting a focusing error and an optical detector 116 for detecting a track error. The optical detector 115 is positioned at a focus of a lens 114. The split light beam from the beam splitter 4B is focused by a lens 117, at a focus of which a slit or an aperture 118 is provided to supply a main lobe component of the split light beam to an optical detector 119 for reading-out information stored in the recording medium 6.

Figure 12:
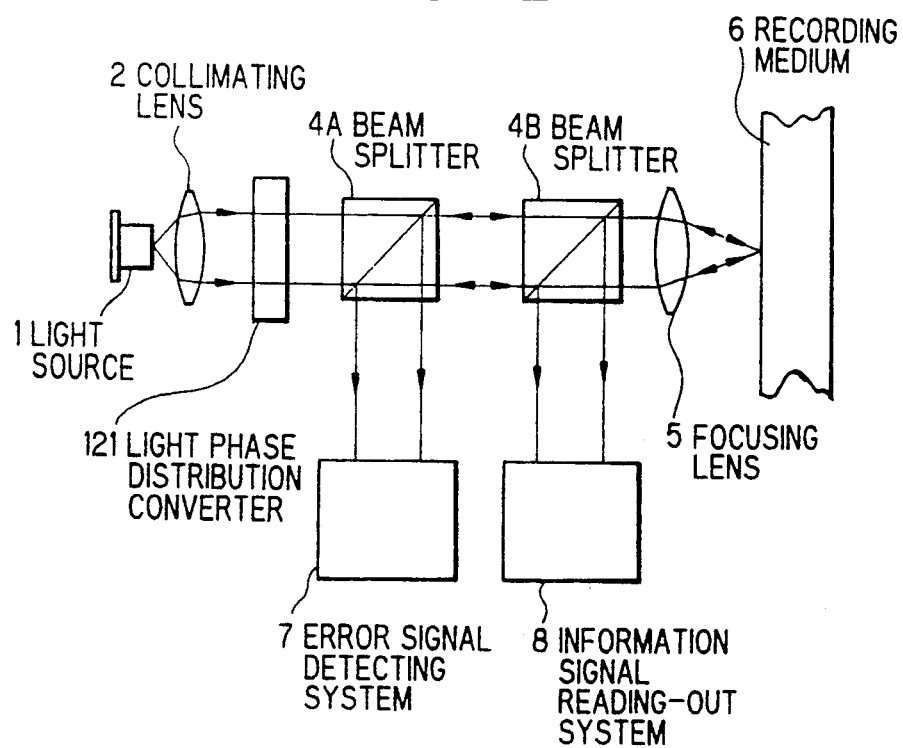
FIG. 12 is an explanatory diagram showing an optical head in a sixth embodiment according to the invention.
Figure 13A:
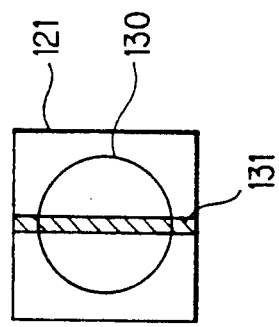
FIGS. 13A and 13B are explanatory diagrams showing a light phase distribution converter in the sixth embodiment and a phase shift amount therein.
Figure 13B:
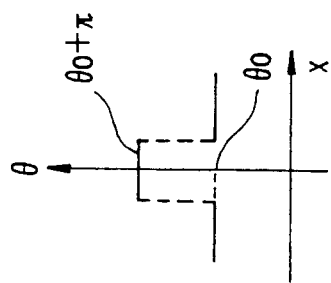

FIG. 12 shows an optical head apparatus in the sixth embodiment according to the invention. In the optical head apparatus, light radiated from a light source 1 is made to be a parallel light beam by a collimating lens 2, and is supplied to a light phase distribution converter 121, in which a central portion of the collimated light beam is changed in its phase by $\pi$. FIG. 13A shows the light phase distribution converter 121, in which the central portion 131 having a narrow and vertical rectangle shape of the collimated light beam 130 is changed in its phase as shown in FIG. 13B. The narrow and vertical rectangular shape may be changed to a circular shape. The phase distribution-converted light beam is transmitted through beam splitters 4A and 4B to be supplied to a focusing lens, by which a super resolution beam spot is formed on a recording medium 6. Light reflected from the recording medium 6 is split to be supplied to an error signal detecting system 7 and an information signal reading-out system 8 by the beam splitters 4A and 4B, respectively.

Figure 14A:
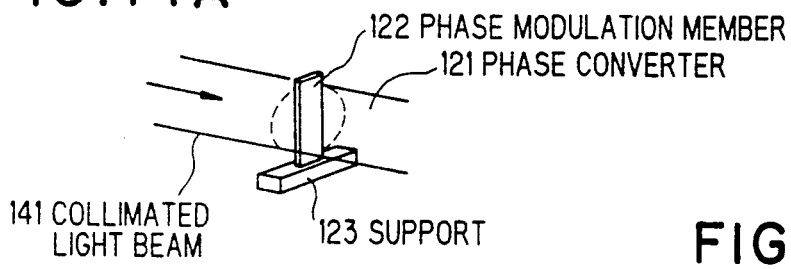
FIGS. 14A to 14C are perspective views showing three types of light phase distribution converters in the sixth embodiment.
Figure 14B:
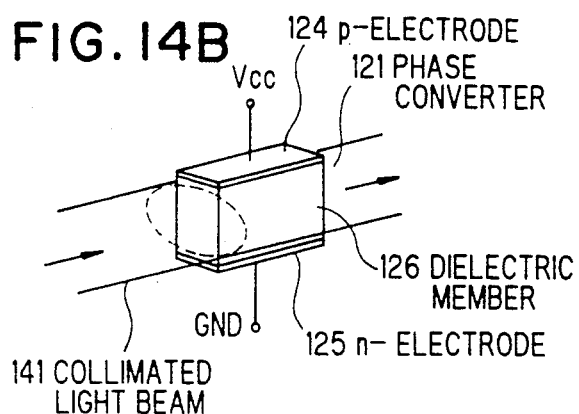
Figure 14C:
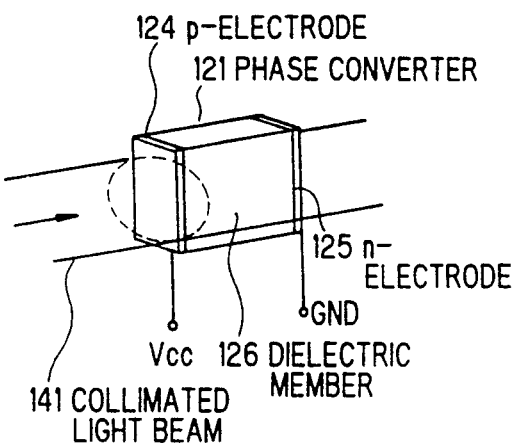

FIGS. 14A to 14C show three types of light phase distribution converters which are used in the optical head apparatus in the sixth embodiment. FIG. 14A shows a first type of the light phase distribution converter 121 which comprises a phase modulation member 122 having a narrow and vertical rectangular shape fixed on a support 123, wherein a central portion of a collimated light beam 141 is modulated in phase to provide a light beam having a phase distribution in its cross-section. FIG. 14*b* shows a second type of the phase distribution converter 121 which comprises a dielectric member 126 such as $LiNbO_3$ etc. having a p-electrode 124 and an n-electrode 125, wherein a collimated light beam is phase-modulated to provide a light beam having a phase distribution in its cross section. The phase distribution converter 121 operates based on the change of the refractive index of the dielectric member 126, and an electric field is applied across the dielectric member 126 vertically relative to a propagating direction of the collimated light beam 141. FIG. 14C shows a third type of the phase distribution converter 121 which is the same as the second type except that an electric field is applied across the dielectric member 126 horizontally relative to a propagating direction of the collimated light beam 141. In the third type of the light phase distribution converter 121, the p- and n-electrodes 124 and 125 must be transparent to pass light therethrough. In the second and third types of the light phase distribution converters 121, a phase changing amount is adjustable electrically.

Figure 15:
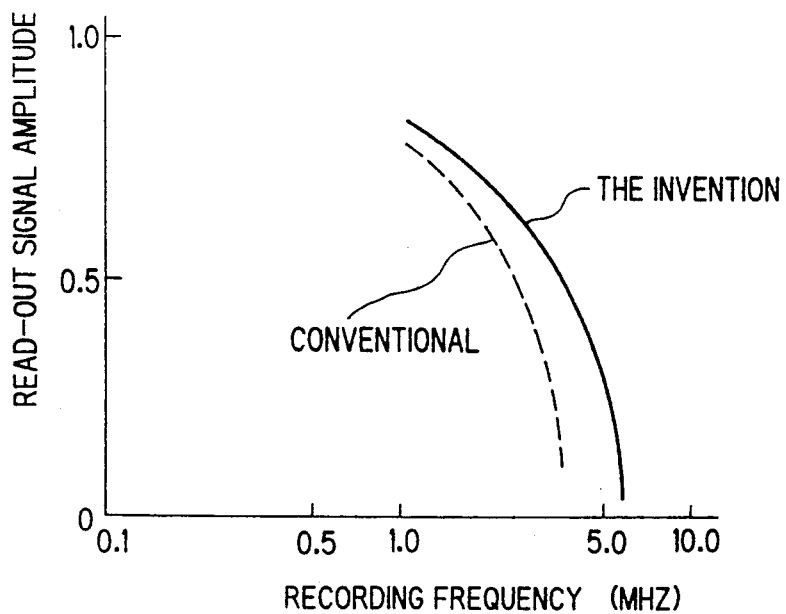
FIG. 15 is a graph showing a read-out signal amplitude relative to a recording frequency in the invention.

FIG. 15 shows a frequency characteristic comparison between the optical head apparatus of the invention and the conventional optical head apparatus, wherein a frequency at which a read-out signal amplitude is decreased to a half value is increased in the invention by 20% as compared to the conventional optical head apparatus. As a result, a recording density is increased in the invention by 20%.

Finally, the aforementioned light intensity distribution converter which is used in the invention will be explained in more detail.

Figure 16A:
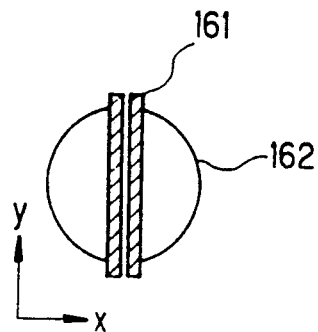
FIGS. 16A to 16C are explanatory diagrams showing a light intensity distribution converter and light intensity distribution obtained thereby.
Figure 16B:
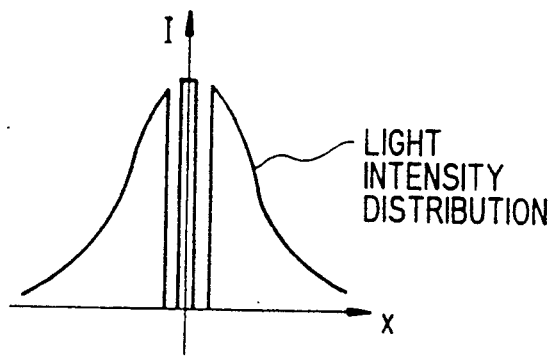
Figure 16C:
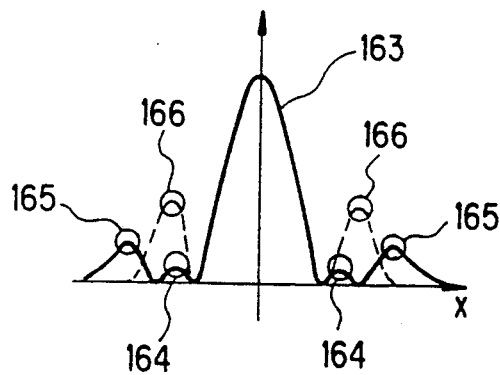

In FIG. 16A a vertical and narrow central portion of a collimated light beam 162 is transmitted through the light intensity distribution converter, and two light shielded regions are formed on the both sides of the central portion by means of light shielding strips 161 of the converter. As a result, a light intensity distribution is obtained in an incident light cross-section of a focusing lens as shown in FIG. 16B. In this case, the light intensity distribution of a focused beam spot is obtained on a recording medium as shown in FIG. 16C by a solid curve, wherein a super resolution beam spot 163 is obtained with first and second order side lobes 164 and 165, while a first order side lobe 166 is obtained in case of using a light shielding strip.

Figure 17A:
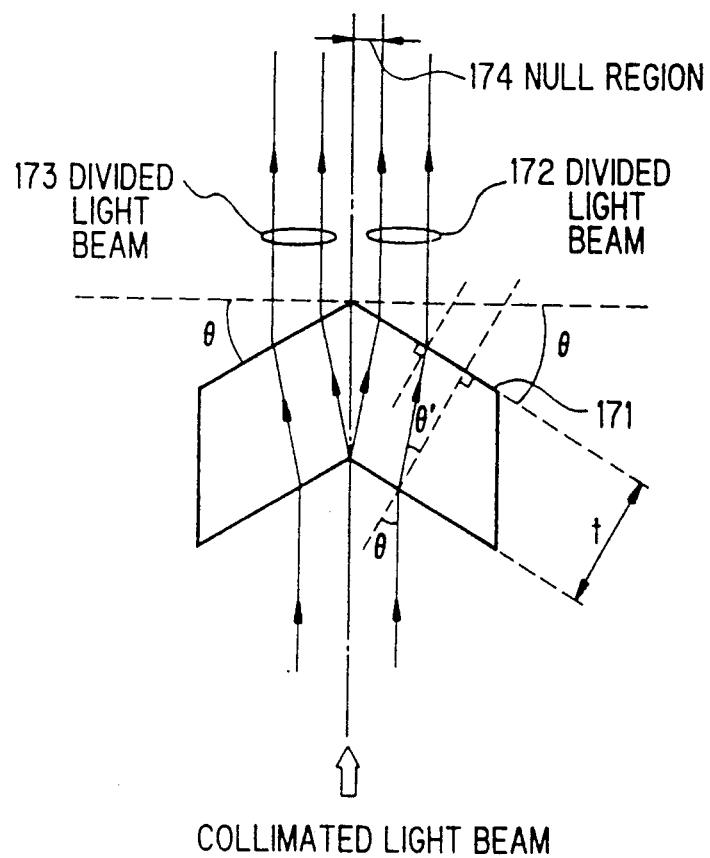
FIGS. 17A and 17B are explanatory diagrams showing a light dividing prism and a light intensity distribution obtained thereby.
Figure 17B:
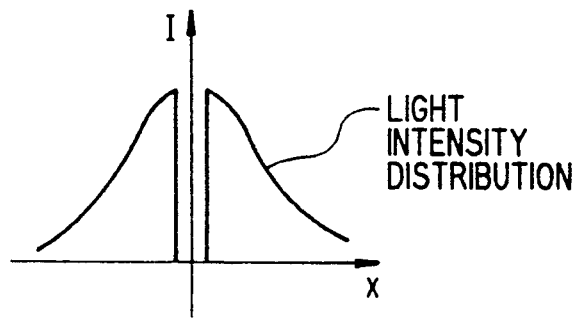

FIG. 17A shows a light beam dividing prism 171 in which a collimated light beam is divided into two parallel divided light fluxes 172 and 173 having a separation region 174. The dividing light beam prism 171 has a thickness t and a dividing angle $\theta$. Where a gap between the light fluxes 172 and 173 is equal to a light shielded width, an intensity distribution of light incident to a focusing lens is obtained as shown in FIG. 17B, wherein a central portion of the distribution is equal to a light shielded region, so that a main lobe of a focused beam spot is reduced in its diameter. The converter provides the reduction of light amount loss, because the light beam is not shielded.

Figure 18A:
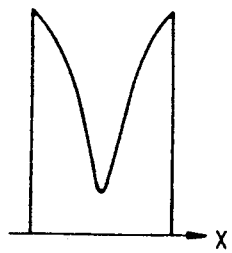
FIGS. 18A and 18B are explanatory diagrams showing a light intensity distribution and a configuration of a minute light beam spot obtained thereby.
Figure 18B:
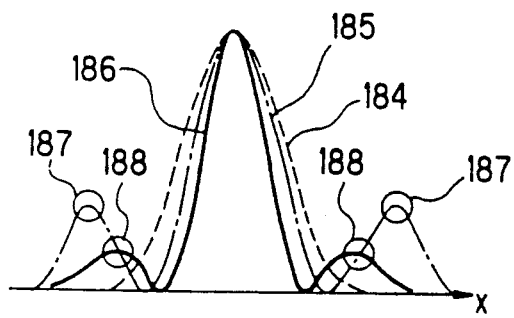

In general, where the decrease of a light intensity is moderate toward a central portion of an output light beam of the light intensity distribution converter, a side lobe intensity of a focused beam spot is decreased. Further, where a peripheral portion of the output light beam is high in its light intensity, the main lobe diameter is reduced. These characteristics are obtained from a light intensity distribution as shown in FIG. 18A, wherein a peripheral portion of the output light beam is maximum in its light amount, and the light amount is decreased toward a central portion of the output light moderately, thereby providing the minimum value in the center of the output light, so that a light intensity of a focused beam spot is distributed on a recording medium as shown in FIG. 18B by a solid curve 186. The light intensity distribution of FIG. 18A is obtained in the aforementioned fourth embodiment. The decrease of light intensity in the vicinity of the central portion is equal to the embodiment in which a light shielding strip is used, so that a focused beam spot having a diameter smaller than an ordinary beam spot 184 is formed in accordance with the effect of super resolution. Further, a focused beam spot having a diameter smaller than that of a focused beam spot in case of using a light shielding strip is formed. where light shielded widths are equal to each other, because the peripheral portion is high in its light intensity. And, a side lobe 188 is lower in its light intensity than a side lobe 187 in case of using a light shielding strip. This is applied to the fourth embodiment as described before.

Figure 19A:
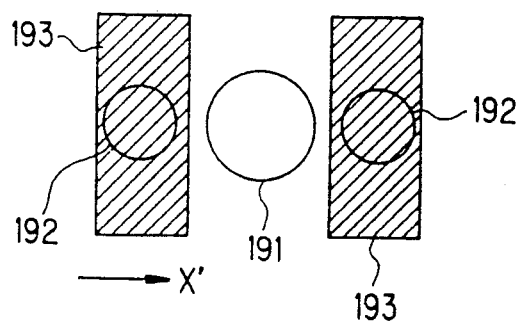
FIGS. 19A and 19B are explanatory diagrams showing a slit and a configuration of a minute light beam spot obtained thereby.
Figure 19B:
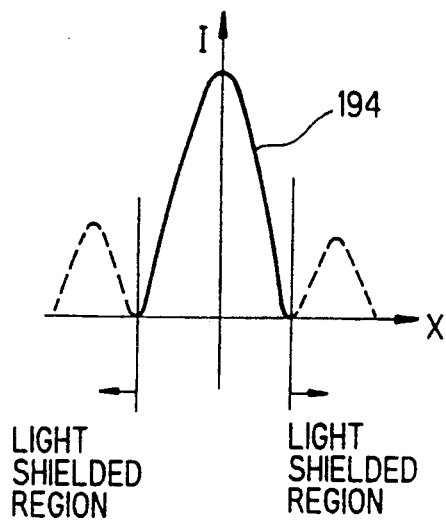

In a super resoluved beam spot, it is impossible to remove a side lobe perfectly. Therefore, a side lobe component comes into the read out signal as noise, so that a read-out signal characteristic is deteriorated. It is possible to remove the deterioration by the provision of a focusing lens (defined re-focusing lens herein) for focusing light reflected from a recording medium and an aperture or a slit positioned in the vicinity of a focus of the refocusing lens. For this purpose, an aperture or a slit defined by two plate members 193, as shown in FIG. 19A, is positioned in the vicinity of a focus of the refocusing lens, at which a super resolution beam spot equal to one formed on a recording medium is formed. In the provision of the aperture or the slit, a side lobe component 192 is shielded, so that a main lobe component 191 is only supplied to an optical detector provided at a rear stage of the aperture or the slit, thereby improving the deterioration of a read-out signal characteristic. FIG. 19B shows a light intensity distribution 194 of the main lobe component passing through the aperture or the slit 193. This is applied to the fifth embodiment.

The change of the light phase is also utilized in place of the conversion of a light intensity distribution, thereby realizing a super resoluved beam spot. As described in the six embodiment, a collimated light beam which is incident to a focusing lens is adjusted in its phase by a light phase distribution converter, so that a central portion 131 of the light beam 130 is phase-controlled in its cross-section by as shown in FIG. 13A. In this case, the light intensity of a focused light beam is distributed to provide a super resolution beam spot equal to one as shown in FIG. 3C by a solid curve 33. The main lobe of the beam spot can be smaller in X-axis direction on a recording medium than a diffraction limit in a contrast of the main lobe in the conventional apparatus indicated by a dotted curve 34. This is explained in the sixth embodiment.

Although the invention has been described with respect to specific embodiments for complete and clear disclosure, the appended claims are not to thus limited but are to be construed as embodying all modification and alternative constructions that may occur to one skilled in the art which fairly fall within the basic teaching herein set forth.

What is claimed is:

1. An optical head apparatus, comprising:
a light focusing system for focusing light radiated from a light source on a recording medium to form a minute light beam spot on said recording medium by means of a focusing lens;
an information reading-out system for reading-out information stored in said recording medium in accordance with the receiving of light reflection from said recording medium; and
a light intensity distribution converter for reducing a light intensity of a central portion of said light radiated from said light source relative to a light intensity of peripheral portion of said radiated light in a cross-section of light incident to said focusing lens, said light intensity distribution converter being positioned between said light source and said light focusing system, wherein said light intensity distribution converter, includes:

a light shielding means for passing light in a central region of said cross-section and shielding light of adjacent regions on both sides of said central portion in said cross-section.

2. An optical head apparatus, comprising:

a light focusing system for focusing light radiated from a light source on a recording medium to form a minute light beam spot on said recording medium by means of a focusing lens;

an information reading-out system for reading-out information stored in said recording medium in accordance with the receiving of light reflecting from said recording medium; and a light intensity distribution converter for reducing a light intensity of a central portion of said light radiated from said light source relative to a light intensity of peripheral portion of said radiated light in a cross-section of light incident to said focusing lens, said light intensity distribution converter being positioned between said light source and said light focusing system, wherein said information reading-out system, includes:

a light focusing system for focusing said reflecting light by means of a focusing lens; and slit means for shielding a side lobe component of said reflected light and supplying a main lobe component of said reflected light to said information reading-out system, said slit means being positioned at a focus of said focusing lens for said reflected light.

3. An optical head apparatus, comprising:

a light focusing system for focusing light radiated from a light source on a recording medium to form a minute light beam spot on said recording medium by means of a focusing lens;

an information reading-out system for reading-out information stored in said recording medium in accordance with the receiving of light reflecting from said recording medium; and a light intensity distribution converter for reducing a light intensity of a central portion of said light radiated from said light source relative to a light intensity of peripheral portion of said radiated light in a cross-section of light incident to said focusing lens, said light intensity distribution converter being positioned between said light source and said light focusing system, wherein said light intensity distribution converter, includes:

a light dividing means for dividing said radiated light into plural and parallel light beam fluxes.

4. An optical head apparatus according to claim 3, wherein said light dividing means comprises a dividing prism and a prism.

5. An optical head apparatus according to claim 3, wherein said light dividing means comprises a step mirror.

6. An optical head apparatus according to claim 3, wherein said light dividing means comprises a first diffraction grating and a second diffraction grating.

7. An optical head apparatus according to claim 3, wherein said light dividing means comprises a light beam dividing prism.

8. An optical head apparatus, comprising:

a light focusing system for focusing light radiated from a light source on a recording medium to form a minute light beam spot on said recording medium by means of a focusing lens;

an information reading-out system for reading-out information stored in said recording medium in accordance with the receiving of light reflected from said recording medium; and a light phase distribution converter for phase-shifting by $\pi$ radians of a central portion of said light radiated from said light source in a cross section of light incident to said focusing lens, said light phase distribution converter being positioned between said light source and said light focusing system.

* * * * *